UNITED STATES PATENT OFFICE.

JAMES WRIGHT LAWRIE, OF MILWAUKEE, WISCONSIN, ASSIGNOR, BY MESNE ASSIGN-
MENTS, TO WILLIAM F. JOBBINS, INCORPORATED, OF AURORA, ILLINOIS, A COR-
PORATION OF ILLINOIS.

PROCESS OF TREATING ALUMINUM SKIMMINGS, SCREENINGS, DROSS, SLAGS, OR
ANALOGOUS ALUMINOUS MATERIALS.

1,228,119.           Specification of Letters Patent.           Patented May 29, 1917.

No Drawing. Original application filed April 8, 1913, Serial No. 759,645. Divided and this application filed September 8, 1913. Serial No. 788,591.

*To all whom it may concern:*

Be it known that I, JAMES WRIGHT LAW-RIE, a citizen of the United States, residing at Milwaukee, in the county of Milwaukee and State of Wisconsin, have invented new and useful Improvements in Processes of Treating Aluminum Skimmings, Screenings, Dross, Slags, or Analogous Aluminous Materials, of which the following is a full, clear, concise, and exact description.

This invention relates to a process of treating aluminum skimmings, screenings, dross, slags or analogous aluminous materials for the purpose of producing therefrom certain valuable and useful products.

In carrying out my invention I prefer the following procedure:

From the skimmings or analogous materials the larger amounts of free aluminum or its alloys are separated, if desired, by suitable means. This treatment leaves a residue consisting chiefly of the oxid, the carbids and the nitrids of aluminum, and contains also the following: compounds of iron, of copper and of zinc, and free carbon in relatively large amounts; free, finely divided aluminum and its alloys and other free metals in smaller amounts; and varying proportions of soluble salts and other impurities. This residue is treated for the production of an aluminate solution by methods somewhat similar to those hitherto employed for the manufacture of this product from bauxite and other alumina-bearing minerals or nitrids of aluminum obtained from these minerals, but differing from these methods in order to avoid the difficulties in treatment due to the impurities found in these skimmings or analogous materials, which impurities are not contained in the other sources of alumina above mentioned, and to utilize as completely as possible those substances contained as impurities but from which valuable products can be obtained. Since this raw material herein described varies as it is obtained from different sources and at different times, the process is sufficiently elastic to be adaptable to all materials obtained, as will be shown herein.

The residue described may, after crushing, if necessary, or otherwise reducing to a suitable degree of fineness, be washed with water to remove the soluble salts, but if it contains a large proportion of nitrids easily decomposed by water this washing may be omitted.

The next step in the process is in the preparation of an aluminate solution by one of the two following methods: (1) by treating the materials, suitably prepared as described above, with a solution of an alkaline caustic, preferably sodium hydroxid, or (2) by fusion with an alkaline carbonate or an alkaline hydroxid and subsequently leaching the fused mass with water.

If the former method of preparing the solution is employed, the following points are to be considered: It is well known that the oxid (and possibly also the nitrids) of aluminum can exist in several modifications differing widely in ease of solubility in acids or alkalis. In the materials from which aluminate solutions are ordinarily manufactured, such as bauxite and other minerals, the aluminum is in the form of a difficultly soluble aluminum oxid, probably hydrated, since all of these minerals contain a relatively large amount of water. The material herein described is practically anhydrous and the oxid and nitrid contained therein are relatively easily soluble, yielding on proper treatment a very rich aluminate solution, because no water is introduced into the solution from the raw materials and because of the relatively easy solubility of the oxid. Consequently, solution of a large part of the available oxid in the alkali may be effected without the application of heat or with the application of but little heat beyond that developed by the reaction, and without the application of pressure, or with the application of but little pressure beyond that developed as a result of the evolution of gases (ammonia, hydrogen, hydrocarbons, etc.) during the course of the reaction. But, owing perhaps to a previous exposure to an unusually high temperature in the melting processes from which these materials are originally obtained, part of the oxids and of the nitrids is more difficultly soluble, and heating under pressure is resorted to in order to dissolve all of the available aluminous content of the material. For the same reason, also, considerable variation in the concentrations and the relative amounts of the caustic alkaline solution used in dissolving the aluminous content of the material is allowable and advisable. In general terms, the amounts and concentrations should be so chosen that hydrated alumina can be precipitated without too much dilution.

The second point to be considered in the step of treating the raw materials with a solution of alkaline caustic is that the materials contain certain compounds which, on treatment with alkalis, give rise to a vigorous evolution of gases consisting in part of ammonia. In this respect the materials herein described differ greatly from others heretofore used for the production of alumina, and therefore the apparatus used for preparing the aluminate solution must be constructed so as to allow of the escape of the gases in such a way that the ammonia may subsequently be separated from the other gaseous products. It is evident, as has been mentioned above, that the pressure produced by the evolution of the gases may be taken advantage of in the process of making the aluminate solution. The ammonia evolved may be finally absorbed in water for the production of aqueous ammonia or in acids for the production of ammonium salts.

If the second process for making the aluminate solution is employed, the quantities of the alkali and the apparatus for the leaching must be chosen with a view to the same considerations as those mentioned above.

To the aluminate solution, either before or during the process of producing it, as described, varying amounts of sulfur or of alkaline sulfid or of other sulfids are added to prevent the contamination of the solution by zinc, or copper or lead, or to remove them if they are already present in the solution. Since alkaline solutions may be thus contaminated by zinc and lead, unless the zinc and lead are removed they rapidly use up the alkali and prevent its repeated use. Copper is caused to go into the alkaline solution apparently by the formation of an organic ammonia derivative, which is relatively stable but which can be decomposed and from which the copper can be precipitated in the manner described. The solution of copper does not always occur. It is clear that the treatment just described does not only prevent the contamination of the solution by copper, zinc and lead, but it has the added advantage of leaving these substances in the residue in a form in which they are very easily extracted and converted into useful products. Furthermore, the treatment would remove from the solution any other metals whose sulfids can be precipitated from alkaline solutions. While this is the process preferred for removing the impurities above mentioned, any other precipitation method may be employed.

After the treatment with the alkaline materials as described above has been continued until practically all of the aluminous content (oxid, nitrids, carbids and free metal) has been dissolved, the resulting aluminate lye solution is separated from the insoluble residue by suitable means, preferably by filtration.

The solid residue may now be treated for the removal of compounds of copper, of iron and of zinc by suitable means, as for instance, by treatment with sulfuric acid, or with other acids, whereby salts of these metals or any of their other useful compounds may be obtained by well known means. As an example of the methods which may be used the following may be cited:

The residue above described may be treated with acids, for example, sulfuric acid, which will dissolve practically all of the copper, zinc and iron compounds. The resulting solution may be separated from the insoluble part and the copper removed from it in several ways; for instance, the solution may be treated with zinc, thus precipitating the copper as metal and enriching the solution with zinc sulfate, or the solution may be electrolyzed with a potential difference, such as to deposit only the copper. Both of these methods would yield copper which can be utilized as such and a solution containing zinc and iron sulfates, and both methods may be made continuous. Or the solution above described may be treated with hydrogen sulfid in the presence of suitable amounts of acid, thus precipitating copper sulfid which can be separated from the remaining solution. From this latter zinc sulfid may be precipitated by suitable regulation of the acid concentration and the various precipitates may be utilized. But other methods known to those skilled in the art may be used.

The aluminate solution freed from copper, zinc and other impurities, as described above, is treated for the precipitation of alumina by various means and the precipitated alumina may be utilized. The solution from which the alumina has been precipitated and removed may be used for dissolving further portions of the original materials. This species of the process forms the subject-matter of my parent application, filed April 8, 1913, Serial No. 759,645.

Although the procedure herein described is the one preferred, various changes may be made to produce the same results without departing from the spirit of the invention. Thus, for instance, if it is desired to separate the main portion of the copper from the zinc at the outset, the sulfur or sulfids may be added after the aluminate lye solution has been separated from the residue containing most of the copper. Thus the zinc will be precipitated as almost pure zinc sulfid and the copper will be left behind in the residue, with other compounds from which it can be readily separated. Or, in case that very little zinc is contained in the skimmings and analogous materials as herein mentioned, which rarely occurs, the treatment with sulfur or sulfids may be omitted. Likewise the preliminary steps of the removal of the larger amounts of free metal, as well as the crushing, may not always be needed and can therefore be omitted.

Having thus described my invention, what I claim as new and desire to secure by Letters Patent is—

1. The method of utilizing aluminum skimmings, slags, dross or analogous waste aluminous materials, which consists in treating the waste materials to form an aluminate solution, separating the solution from the solid residue and separating the copper, iron and zinc or any of them therefrom.

2. The method of utilizing aluminum skimmings, slags, dross or analogous waste aluminous materials, which consists in treating the waste materials with a solution of alkaline caustic, separating the resulting aluminate solution from the solid residue and separating the copper, iron and zinc or any of them therefrom.

3. The method of utilizing aluminum skimmings, slags, dross or analogous waste aluminous materials, which consists in treating the waste materials to form an aluminate solution, precipitating as sulfids the zinc, copper and other impurities from the aluminate solution, separating the solution from the solids and separating the copper, iron and zinc or any of them therefrom.

4. The method of utilizing aluminum skimmings, slags, dross or analogous waste aluminous materials, which consists in treating the waste materials with a solution of alkaline caustic to produce an aluminate solution, precipitating as sulfids the zinc, copper and other impurities from the aluminate solution, separating the solution from the solids and separating the copper, iron and zinc or any of them therefrom.

5. The method of utilizing aluminum skimmings, slags, dross or analogous waste aluminous materials, which consists in treating the waste materials to form an aluminate solution, precipitating the zinc, copper and other impurities from the aluminate solution, separating the solution from the solids, and separating the copper, iron and zinc or any of them therefrom.

6. The method of utilizing aluminum skimmings, slags, dross or analogous waste aluminous materials, which consists in treating the waste materials with a solution of alkaline caustic to produce an aluminate solution, precipitating the zinc, copper and other impurities from the aluminate solution, separating the solution from the solids, and separating the copper, iron and zinc or any of them therefrom.

7. The method of utilizing aluminum skimmings, dross or analogous waste aluminous materials, which consists in treating the waste materials with a solution of alkaline caustic to produce an aluminate solution, precipitating the zinc, copper and other impurities from the aluminate solution, separating the solution from the precipitate, dissolving the precipitate in an acid and treating the solution with zinc to precipitate the copper therein.

In witness whereof, I have hereunto subscribed my name in the presence of two witnesses.

JAMES WRIGHT LAWRIE.

Witnesses:
RICHARD A. LOEFFLER,
DONALD K. EWING.